March 6, 1934. T. O. OTT 1,950,061
HULL EXTRACTOR
Filed Feb. 4, 1931 2 Sheets-Sheet 2
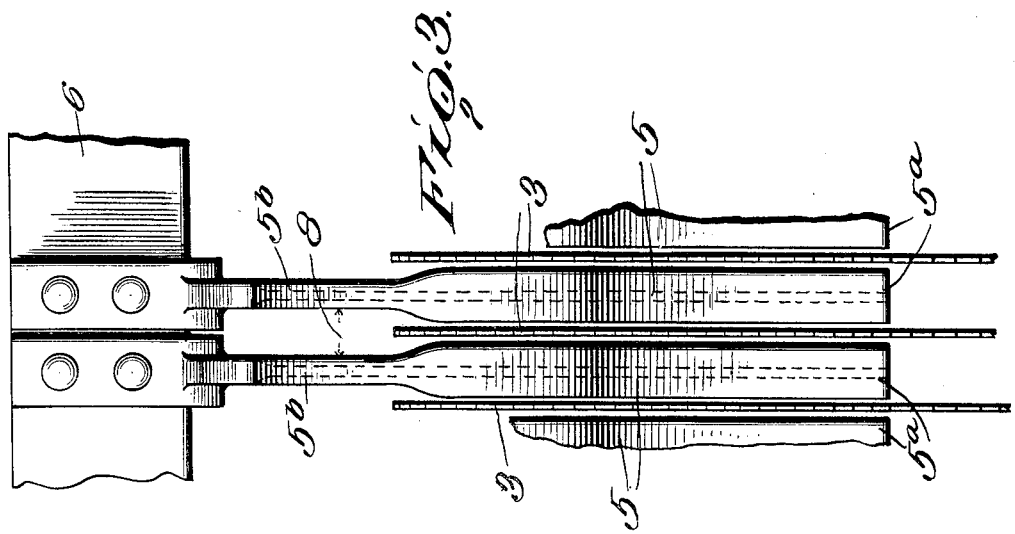
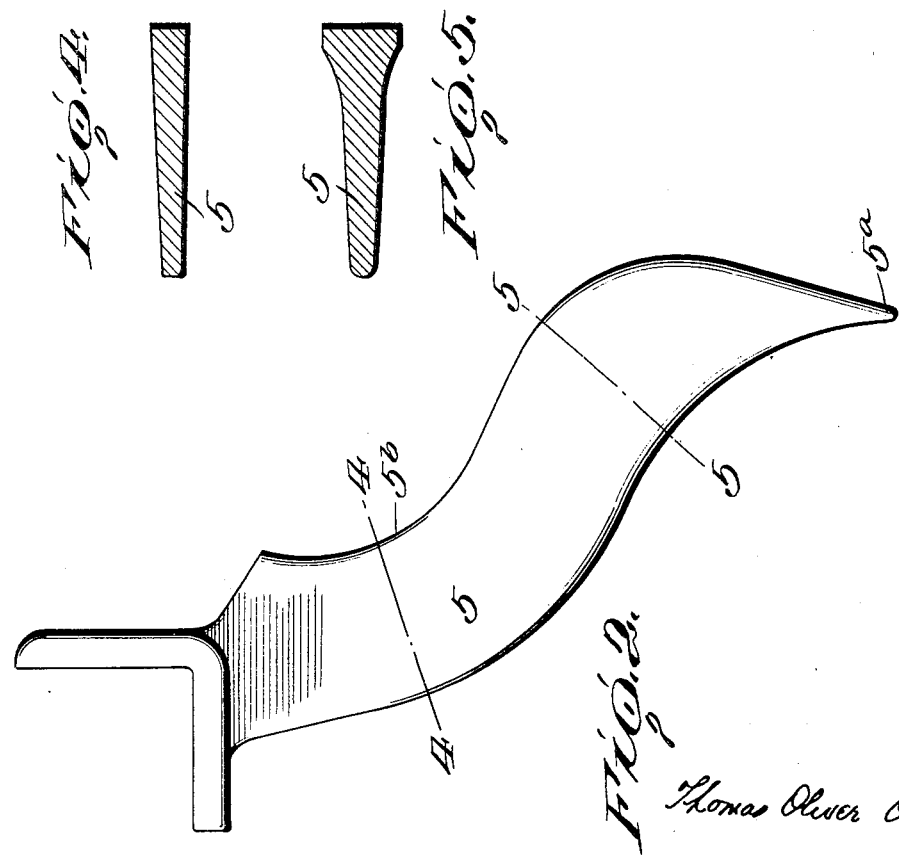
Inventor
Thomas Oliver Ott
By Sturtevant Mason & Porter
Attorneys Patented Mar. 6, 1934

1,950,061

UNITED STATES PATENT OFFICE 1,950,061

HULL EXTRACTOR

Thomas Oliver Ott, Columbus, Ga., assignor to Cen-Tennial Cotton Gin Co., Columbus, Ga., a corporation of Georgia Application February 4, 1931, Serial No. 513,430

7 Claims. (Cl. 19—38)

The invention relates to new and useful improvements in a hull extractor for removing the hulls and trash from seed cotton.

An object of the invention is to create a hull extractor wherein devices are provided for loosening and removing the hulls from the cotton bolls, and with means whereby, at will, the seed cotton may be directed so as to bypass the hulling device and be delivered directly to the cleaner of the hull extractor.

A further object of the invention is to create a hull extractor wherein relatively coarse saws are used in connection with spaced huller ribs for stripping the hulls from the seed cotton, and wherein said ribs extend across the path of travel of the teeth of the saw and terminate within said path of travel.

A still further object of the invention is to provide a hull extractor of the above type wherein the huller ribs are suspended from a swinging bar which is capable of being turned so as to move the ribs away from the saws to facilitate the cleaning of the same.

A still further object of the invention is to provide a hull extractor of the above type wherein a screen is associated with the saws and closely spaced relative thereto so that any seed cotton falling on the screen will be picked up by the saws and carried to the point where the brush strips the cotton from the saw.

A still further object of the invention is to provide a machine of the above type wherein an equalizing picker roll is mounted in front of the saws and in the region where the ribs strip the bolls and trash from the seed cotton, and wherein conveyor picker rolls are provided for feeding the hulls and clinging seed cotton back and forth across the saw.

These and other objects will in part be obvious and will in part be hereinafter more fully disclosed.

In the drawings which show by way of illustration more or less diagrammatically one embodiment of the invention—

Fig. 2 is a side view of one of the huller ribs on an enlarged scale;

Fig. 3 is a side view showing two of the ribs and the associated saw;

Fig. 4 is a section on the line 4—4 of Fig. 2, and

Fig. 5 is a section on the line 5—5 of Fig. 2.

Figure 1:
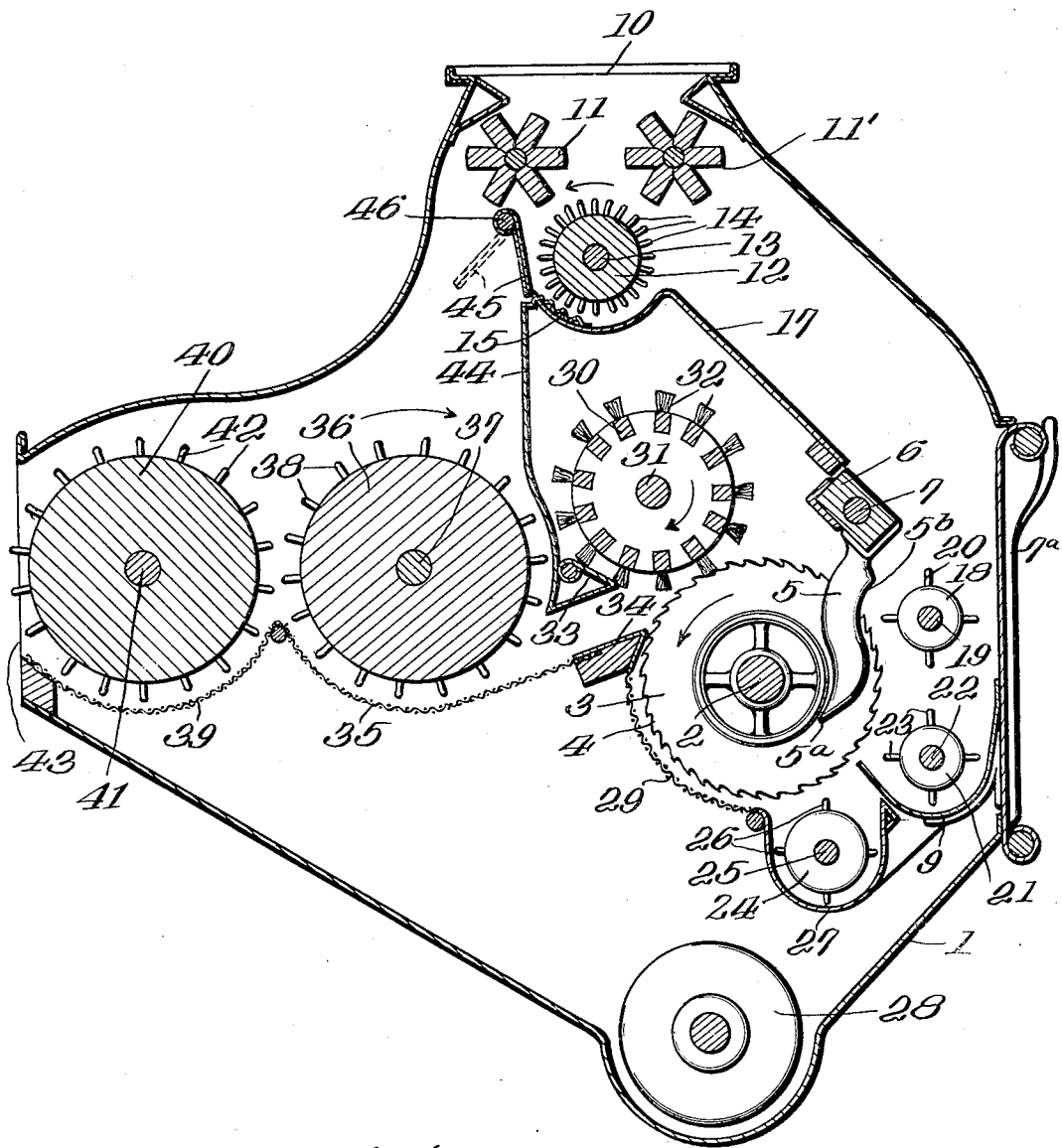
Figure 1 is a vertical sectional view through the body portion of a hull extractor embodying the improvements.

The invention is directed to a hull extractor which is provided with means operated at will and during the running of the machine for bypassing the seed cotton so that it may be delivered directly to the cleaning portion of the hull extractor without being subjected to the action of the saws and huller ribs thereon. The hull loosening and removing devices include a series of relatively coarse saws spaced on a rotating shaft. Associated with the saws are the huller ribs. These huller ribs are all mounted on a bar located above the saw and depending from the bar. The huller ribs are what might be termed "half ribs" and they extend across the path of travel of the saw teeth and terminate within said path of travel of the saw teeth. The huller ribs are so shaped so as to provide a relatively wide throat in the region of the path of travel of the saw teeth so that the clinging seed cotton will be stripped from the boll, but the cotton fiber will not be torn from the seed. The cotton is fed to a beater roll which cooperates with a corrugated breaker plate for loosening the bolls. The cotton then falls on to an equalizing roll consisting of radially extending rods arranged in such a manner as to equalize the feed. Also associated with the saw below this equalizing roll are two feed picker rolls with spirally arranged rods for feeding the cotton back and forth across the saw cylinder. Also associated with the saw cylinder is a screen located beneath the saw cylinder and close to the saw cylinder through which stems and trash may be separated from the cotton, and this screen is sufficiently close to the saw so that the cotton thereon will be picked up by the saw and carried again between the huller ribs and to the brush which removes the cotton from the saw. Associated with the stripper brush cooperating with the saws, is a wind breaker and stripper for stripping and directing the cotton to the cleaning section of the hull extractor. This cleaning section consists of two spiked rolls located close to cleaning screens which carry the cotton forward across the screens and deliver the same from the hull extractor. Close to the beater roll is located a gate which can be manually opened at will while the machine is in operation. When this gate is open, the seed cotton fed on to the beater roll will be delivered through the gateway into the cleaning portion of the hull extractor, and thus it is that good clean cotton may be passed through the cleaner without going through the devices for stripping the hulls therefrom.

Referring more in detail to the drawings, the invention is shown as embodied in a hull extractor which includes a supporting framework having an enclosing casing indicated at 1 in the drawings. Mounted for rotation in the framework is a shaft 2 carrying a series of saws 3 provided with relatively coarse saw teeth 4. These saws are spaced as shown in Fig. 3 of the drawings. Between the saws are huller ribs 5. The huller ribs are rigidly attached to a rib bar 6 which is mounted to swing on trunnions 7 in the frame of the machine. Means is provided for holding this bar in rigid position when the ribs are in their operative position relative to the saws. At the front of the casing is a door 7ª which may be readily opened, and then the bar 6 can be turned so that the ribs are rendered accessible through this opening for cleaning. The huller ribs depend or are suspended from this bar and they extend across the path of travel of the saw teeth terminating at 5ª, a point well within the path of travel of the teeth of the saw. The huller rib, at its outer face is curved inwardly and downwardly as indicated at 5ᵇ in the region of the path of travel of the teeth of the saw. The cotton bolls caught on the teeth of the saw are carried against this face 5ᵇ of the huller ribs. It will be noted that the huller rib in the region within the path of travel of the saw teeth increases in thickness from the inner edge thereof to the outer edge thereof, as clearly shown in Fig. 5. This provides a strong rib having little or no spring thereto at its lower end. The huller ribs in the region where the saw teeth pass the same are shaped so that they only increase gradually in thickness from the inner end to the outer end thereof, thus providing a relatively wide throat 8 through which the seed cotton is forcibly carried by the saw without tearing the fibers or locks of cotton from the seed. The hulls and trash, however, striking the huller ribs, will be stripped from the seed cotton and will fall into a chute and be conveyed to picker roll 21.

The cotton bolls are fed to the hull extractor through an opening 10 at the upper end thereof. Rotating feed rolls 11, 11 force the cotton on to a beater roll 12 which is carried by a shaft 13 mounted in suitable bearings in the frame. This beater roll is provided with a series of spikes 14. Associated with the beater roll is a corrugated breaker plate 15. This beater roll will loosen the hulls and feed the cotton forward on to the inclined plate 17 from which it is discharged on to the equalizing roll 18 mounted for rotation on a shaft 19. This equalizing roll 18 has a series of spikes 20 projecting radially therefrom which are preferably set in planes at right angles to the axis of the roll. This is a feed and equalizing roll which agitates the bolls and carries them against the teeth of the rotating saws. Located in front of the saws and beneath the equalizing roll is a picker feed roll 21 mounted for rotation on a shaft 22. This picker roll is provided with a series of spikes 23 which are preferably arranged in spiral rows from one end of the roll to the other, so that the cotton bolls gathered in the chute 9 will be conveyed along said chute, constantly thrown against the saws and finally discharged from one end of the chute 9 on to the feed roll 24 which is mounted for rotation on the shaft 25. This feed roll is provided with a series of spikes 26 radially disposed and arranged in spiral rows which operate to feed the cotton bolls in the opposite direction across the saw cylinder and discharge the hulls and trash accumulating in the bottom of the chute 27 into the chute at the bottom of the machine, where the conveyor 28 discharges the hulls and trash from the machine. Associated with the saw cylinder is a screen 29. This screen 29 is curved to conform to the curvature of the saws and is spaced a short distance therefrom. The cotton and trash clinging to the saws which pass the stripping brush will fall on to this screen which will remove some of the dirt and trash and any cotton falling on to the screen will be taken up by the saws and carried through the huller ribs so as to be again submitted to the stripping brush. By this arrangement of screen and by the arrangement of the half ribs, there is little or no clogging during the operation of the machine. The seed cotton has a free path of travel, and only the hulls and stems are stripped from the cotton and discharged from the machine.

Mounted above the saw cylinder is a stripper roll 30 which is mounted for rotation on a shaft 31. Said stripper roll is provided with a series of brushes 32 which move across the saws and strip the cotton therefrom. This stripper roll rotates in the direction of the arrow as shown in Fig. 1. The saws also rotate in the direction of the arrow, as indicated in this figure. Associated with this brush stripper roll is a wind breaker 33 which is in the form of a plate located close to the path of travel of the outer ends of the brushes. Said plate terminates in a sharp V-shaped edge, and as the cotton fiber is carried against this wind breaker and stripper plate, it will be dislodged from the brush and fall on to the inclined plate 34 and will be forced along this plate on to the cleaning screen 35. Associated with this cleaning screen is a feed roll 36 mounted for rotation on a shaft 37. Said roll is provided with a series of radially extending spikes 38 which positively carries the cotton along the screen and delivers the same to the screen 39. A feed roll 40 is mounted for rotation on a shaft 41 and provided with a series of spikes 42 carries the cotton across the screen 39 and delivers the cotton from the hull extractor through an opening 43. Located directly in rear of the stripper brush 30 is a partition plate 44 which extends from the inner end of the breaker plate 15 to the wind breaker 32. The lower end of this partition plate is curved to conform to the path of travel of the spikes in the feed roll 36. This feed roll travels in the direction indicated by the arrow in Fig. 1. Mounted adjacent the beater roll 12 is a swinging gate 45. Said gate is fixed to a shaft 46 mounted in suitable bearings and extending outside of the casing of the machine so that it may be turned manually for swinging the gate from a full line position shown in Fig. 1, to the dotted line position shown therein. When the gate is in the full line position, the cotton falling on to the beater roll 12 will be carried on to the breaker plate 15 and then delivered on to the plate 17 so that it will pass through the hull extracting devices on its way to the feed rolls 36 and 40 associated with the cleaning screens. When the gate is swung to the dotted line position, then the beater roll 12 will feed the cotton bolls through the gateway and on to the feed roll 36 which will carry the cotton around on to the screen 35 and deliver the same to the feed roll 40 which carries it across the screen 39 and delivers the same from the machine. The operator can, at will, without stopping the machine, swing the gate when there is a run of good cotton, which does not need to be passed through the hull extractor, and this cotton will then pass directly to the cleaning portion of the hull extractor and be delivered through the opening 43 to the huller gin. On the other hand, when a cotton run is of such a character that it needs to be passed through the hull extractor for loosening and removing the hulls and trash therefrom, the gate is swung to the full line position and then the cotton bolls take the path of travel which has been described above. It is understood that this hull extractor is to be used in connection with a huller gin and that there is no appreciable ginning of the cotton as it passes through this hull extractor.

From the above description it will be apparent that I have provided a machine for treating cotton which is a combined hull extractor and feeder. It may be used solely as a feeder or solely as a hull extractor, and at will, may be converted one into the other.

It is obvious that changes in the details of construction and the arrangement of the parts may be made without departing from the spirit of the invention as set forth in the appended claims.

Having thus described the invention, what I claim as new and desire to secure by Letters-Patent, is—

1. A hull extractor for seed cotton including a saw cylinder, huller ribs associated therewith, means for feeding the cotton bolls to the saw cylinder, a beater roll adapted to receive the cotton bolls, a stationary breaker plate associated therewith, said huller ribs being supported from a bar above the saw cylinder and extending across the path of travel of the teeth of the saw and terminating within said path of travel, means for supporting said bar whereby the same may be turned to move the huller ribs away from the saw cylinder for rendering the same accessible for cleaning and feed picker rolls for feeding the cotton back and forth across the saw cylinder.

2. A hull extractor for seed cotton including a saw cylinder, huller ribs associated therewith, means for feeding the cotton bolls to the saw cylinder, a beater roll adapted to receive the cotton bolls, a stationary breaker plate associated therewith, said huller ribs being supported from a bar above the saw cylinder and extending across the path of travel of the teeth of the saw and terminating within said path of travel, means for supporting said bar whereby the same may be turned to move the huller ribs away from the saw cylinder for rendering the same accessible for cleaning feed picker rolls for feeding the cotton back and forth across the saw cylinder, and a screen associated with the saw cylinder and disposed adjacent thereto so that cotton falling on to the screen may be picked up by the teeth of the saw and carried between the huller ribs.

3. A hull extractor for seed cotton including a saw cylinder, huller ribs associated therewith, means for feeding the cotton bolls to the saw cylinder, a beater roll adapted to receive the cotton bolls, a stationary breaker plate associated therewith, said huller ribs being supported from a bar above the saw cylinder and extending across the path of travel of the teeth of the saw and terminating within said path of travel, means for supporting said bar whereby the same may be turned to move the huller ribs away from the saw cylinder for rendering the same accessible for cleaning feed picker rolls for feeding the cotton back and forth across the saw cylinder, and a stripper brush associated with said saw cylinder for stripping the seed cotton therefrom.

4. A hull extractor for seed cotton including a saw cylinder, huller ribs associated therewith, means for feeding the cotton bolls to the saw cylinder, a beater roll adapted to receive the cotton bolls, a stationary breaker plate associated therewith, said huller ribs being supported from a bar above the saw cylinder and extending across the path of travel of the teeth of the saw and terminating within said path of travel, means for supporting said bar whereby the same may be turned to move the huller ribs away from the saw cylinder for rendering the same accessible for cleaning feed picker rolls for feeding the cotton back and forth across the saw cylinder, a stripper brush associated with said saw cylinder for stripping the seed cotton therefrom, and a wind breaker associated with said stripper brush for stripping and directing the seed cotton from the stripper brush.

5. A hull extractor for seed cotton including a saw cylinder, huller ribs associated therewith, means for feeding the cotton bolls to the saw cylinder, a beater roll adapted to receive the cotton bolls, a stationary breaker plate associated therewith, said huller ribs being supported from a bar above the saw cylinder and extending across the path of travel of the teeth of the saw and terminating within said path of travel, means for supporting said bar whereby the same may be turned to move the huller ribs away from the saw cylinder for rendering the same accessible for cleaning feed picker rolls for feeding the cotton back and forth across the saw cylinder, a stripper brush associated with said saw cylinder for stripping the seed cotton therefrom, a wind breaker associated with said stripper brush for stripping and directing the seed cotton from the stripper brush, cleaning screens for receiving the cotton from the stripper brush, and feed rolls for feeding the seed cotton across the screens.

6. A combined hull extractor and feeder for seed cotton, including a saw cylinder, huller ribs associated therewith for separating the hulls from the seed cotton, means for feeding the cotton bolls to the saw cylinder, said huller ribs being supported from a bar above the saw cylinder and extending across the path of travel of the teeth of the saw and terminating within said path of travel, means for supporting said bar whereby the huller ribs may be moved away from the saw cylinder for cleaning, cleaning screens, feed rollers associated therewith, means for receiving the cotton from the saw cylinder and delivering the same to the feed rollers associated with the cleaning screens, and means operated at will for feeding the seed cotton directly to the cleaning screens or to the saw cylinders and then to the cleaning screens.

7. A combined hull extractor and feeder for seed cotton, including a saw cylinder, huller ribs associated therewith for separating the hulls from the seed cotton, means for feeding the cotton bolls to the saw cylinder, a beater roll adapted to receive the cotton bolls, a breaker plate associated therewith, said huller ribs being supported from a bar above the saw cylinder and extending across the path of travel of the teeth of the saw and terminating within said path of travel, means for supporting said bar whereby the huller ribs may be moved away from the saw cylinder for cleaning, a screen associated with the saw cylinder and disposed adjacent thereto so that cotton falling on the screen may be picked up by the teeth of the saw and carried between the huller ribs, cleaning screens, feed rollers associated therewith, means for receiving the cotton from the saw cylinder and delivering the same to the feed rollers and cleaning screens, means operated at will for directing the cotton received from the feed rollers directly to the cleaning screens or to the cylinder and then to the cleaning screens.

THOMAS OLIVER OTT.